United States Patent [19]

Monden

[11] 4,158,889
[45] Jun. 19, 1979

[54] CALCULATOR FOR CALCULATING $A^x$ WITH THE BASE A OF ANY POSITIVE NUMBER BY CALCULATING COMMON LOGARITHM OF A

[75] Inventor: Hiroshi Monden, Tokyo, Japan

[73] Assignee: Nippon Electric Co., Ltd., Tokyo, Japan

[21] Appl. No.: 876,153

[22] Filed: Feb. 8, 1978

[30] Foreign Application Priority Data

Feb. 8, 1977 [JP] Japan .................. 52-12131

[51] Int. Cl.² .............................................. G06F 7/48
[52] U.S. Cl. .................................................. 364/753
[58] Field of Search ............... 364/753, 709, 200, 900

[56] References Cited

U.S. PATENT DOCUMENTS

| 3,863,060 | 1/1975 | Rode et al. ................. 364/709 X |
| 4,035,627 | 7/1977 | Dickinson et al. ........... 364/709 X |

Primary Examiner—David H. Malzahn
Attorney, Agent, or Firm—Hopgood, Calimafde, Kalil, Blaustein & Lieberman

[57] ABSTRACT

A calculator for calculating $a^x$ with the base a of an optional positive number comprises a first circuit for calculating $\log_{10}a$. A multiplier calculates $x \cdot \log_{10}a$, which is separated into an integral part $z_i$ and a fractional part $z_f$. The integer $z_i$ represents the place of the decimal point in the desired result. A second circuit calculates $10^{z_f}$ which gives the desired result as a number equal to or greater than unity and smaller than ten. The number is stored in a register without the decimal point. With the decimal point put as indicated by the integer $z_i$, the number gives the desired result. A second circuit may comprise a combination of operation registers, a multiplier, and an adder for calculating the power by combination of multiplication and addition.

6 Claims, 3 Drawing Figures

CALCULATOR FOR CALCULATING $A^x$ WITH THE BASE A OF ANY POSITIVE NUMBER BY CALCULATING COMMON LOGARITHM OF A

BACKGROUND OF THE INVENTION

This invention relates to a calculator for calculating an exponential function $a^x$ with the base a of an optional positive number. The exponent or power x is a real number throughout the specification, unless otherwise specified. It should also be noted that the "function" as called herein means a specific value of the function for a certain given value of the independent variable.

It is often required in scientific calculation to calculate with a calculator an exponential function $e^x$ or expx with the base e, known as the base of natural logarithm, and another exponential function $10^x$ with the base ten. Most of the calculators for scientific use therefore have subroutines stored therein for calculation of such special exponential functions. On the other hand, it is not seldom to feel the necessity of calculating a general exponential function $a^x$ with the base a, where the base a is a positive number other than e and ten. On calculating the general exponential function $a^x$ with a conventional scientific calculator, it is necessary to calculate at first lna, where the operator "ln" represent natural logarithm, and then x(lna). By the use of the calculated value of x(lna), it is now possible to calculate the value of exp[x(lna)], namely, the general exponential function $a^x$.

A conventional scientific calculator is thus inconvenient. Moreover, the calculator has to comprise a complicated circuit for carrying out preliminary calculations even for calculation of the specific exponential function $e^x$. The subroutine for calculating the desired value of $e^x$ is to resort to the power series for $e^x$ known as:

$$e^x = 1 + x/1! + x^2/2! + x^3/3! + \ldots,$$

which series converges only slowly unless the absolute value of x is smaller than unity. The preliminary calculation circuit is for modifying the given value of x so as to make the power series converge rapidly. At any rate, use of the power series reduces the speed of calculation.

SUMMARY OF THE INVENTION

It is therefore an object of this invention to provide a calculator for directly calculating an exponential function $a^x$ with the base a, where the base a is a positive number and the exponent x is a real number.

It is another object of this invention to provide a calculator of the type described, which is simple in structure.

A calculator to which this invention is applicable is for calculating an exponential function $a^x$ with the base a in response to a base signal representative of the base and an exponent signal representative of the exponent to produce a result signal representative of the exponential function, where a and x represent a positive and a real number of decimal notation, respectively. The calculator according to this invention comprises first calculation means responsive to the base signal for calculating a common logarithm of the base a to produce a common logarithm signal representative of the common logarithm, second calculation means responsive to the common logarithm and the exponent signals for multiplying the common logarithm by the exponent to produce a product signal representative of that product of the common logarithm and the exponent which has a characteristic and a mantissa part, separation means responsive to the product signal for separating the characteristic and the mantissa parts to individually produce a characteristic and a mantissa signal representative of the characteristic and the mantissa parts, respectively, memory means for memorizing a reference signal representative of a reference value for a calculation of ten to the power of the mantissa part, third calculation means responsive to the reference and the mantissa signals for calculating ten to the power of the mantissa part to produce a power signal representative of ten to the power of the mantissa part, and output means for producing the characteristic and the power signal in combination as the result signal.

DESCRIPTION OF THE PREFERRED EMBODIMENTS

Figure 1:
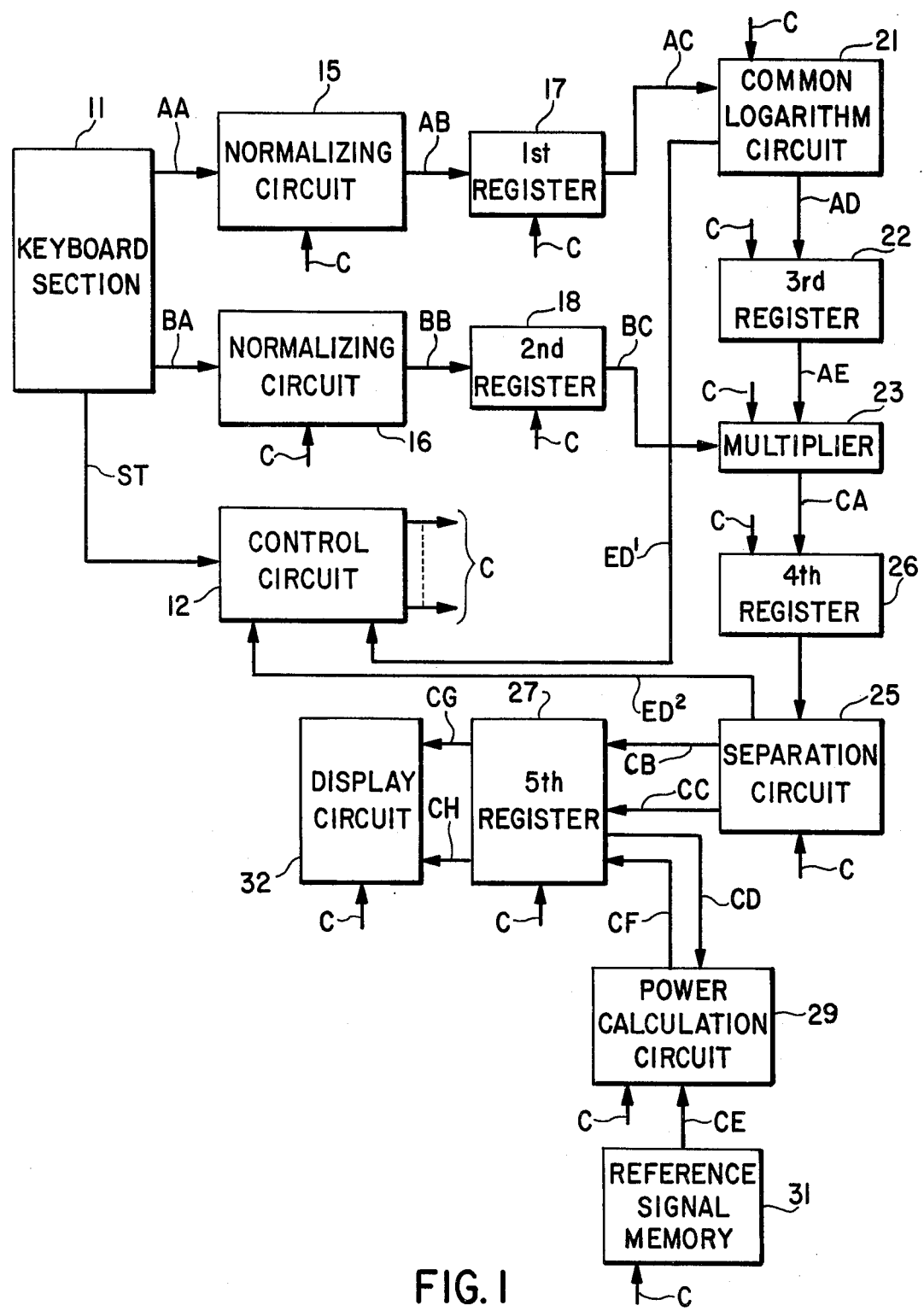
FIG. 1 is a block diagram of a calculator according to an embodiment of this invention.

Referring to FIG. 1, a calculator according to an embodiment of this invention is for calculating an exponential function $a^x$ with the base a of a given positive number, which may not necessarily be either e or ten. It is assumed that the calculator is capable of also calculating usual sums and other results of arithmetic calculations. The calculator comprises a keyboard section 11 having a plurality of register keys and a plurality of operation keys (not shown). The register keys have visual indications of decimal numbers and a decimal point for use in setting in the calculator those numbers which are to be used in the calculations. When a key or keys for the base a are successively touched or otherwise operated, the keyboard section 11 produces a base signal AA representative of the base a. The operation keys have visual indications indicative of arithmetic and other operations for specifying the calculations to be performed by the calculator. When an operation key for the exponential function is touched, the keyboard section 11 produces a signal that specifies calculation of the exponential functions $a^x$. Inasmuch as such operation keys and signals produced thereby are known in the art, description is omitted as regards the exponential function specifying signal together with description of other operation keys and elements to be put into operation by operation of such keys. When one or more register keys for the exponent x are touched, the keyboard section 11 produces an exponent signal BA representative of the exponent x and a start signal ST. It is to be understood that each of the base a and the exponent x should be given by a finite number of significant figures and that the order of operation of the base-setting and the exponent-setting register keys is readily reversed with a slight modification of the illustrated calculator.

In the calculator depicted in FIG. 1, a control circuit 12 holds a program for putting the remaining parts into operation and is responsive to the start signal ST following the exponential function specifying signal for producing various control signals C in accordance with the program. The control signals will not be specifically described because these signals are for merely properly timing operation of the remaining parts. The base and the exponent signals AA and BA are supplied to first and second normalizing circuits 15 and 16, respectively. Each of the normalizing circuits 15 and 16 separates a relevant one of the base a and the exponent x into a coefficient and a normalized power, presently described, to produce a concerned one of normalized base and exponent signals AB and BB. For normalization, a positive number is given by:

$$p \cdot 10^n,$$

where p represents the coefficient and n, the normalized power, both mentioned above. The coefficient p is equal to or greater than unity and smaller than ten. The normalized power n is an integer that may be either zero or a negative integer. The normalized base and exponent signals AB and BB represent the coefficients p and the normalized powers n of the base a and the exponent x, respectively, and are stored in first and second registers 17 and 18, respectively. Supplied from the first register 17 with the normalized base signal AB as a stored base signal AC, a common logarithm circuit 21 calculates a common logarithm $\log_{10} a$ of the base a to supply a common logarithm signal AD representative of the common logarithm $\log_{10} a$ to a third register 22 and a first end signal $ED^1$ back to the control circuit 12. Responsive to the end signal $ED^1$, the control circuit 12 makes the third register 22 supply the common logarithm signal AD as a stored logarithm signal AE to a multiplier 23 and also the second register 18, the normalized exponent signal BB therefore as a stored exponent signal BC. The multiplier 22 calculates a product z of the common logatithm $\log_{10} a$ and the exponent x to produce a product signal CA representative of the product z. As is the case with the common logarithm $\log_{10} a$, the product z consists of a characteristic $z_i$ and a mantissa $z_f$ that are related to the product z by:

$$z = x \cdot \log_{10} a = z_i + z_f$$

and are an integral and a fractional part, respectively, of the product z.

Further referring to FIG. 1, the product signal CA is supplied to a separation circuit 25, described later, through a fourth register 26. The separation circuit 25 separates the product z into the characteristic $z_i$ and the mantissa $z_f$ to produce a characteristic signal CB representative of the characteristic $z_i$, a mantissa signal CC for the mantissa $z_f$, and a second end signal $ED^2$. A fifth register 27 has a first and a second field as will become clear as the description proceeds. The characteristic signal CB is supplied to the first field and memorized therein. The mantissa signal CC is supplied to the second field and temporarily stored therein to be delivered therefrom to a power calculation circuit 29 as a stored mantissa signal CD. A reference signal memory 31, which may be a read-only memory, memorizes a reference signal CE representative of a reference value for use in calculating ten to the power of the mantissa part and supplies the same to the power calculation circuit 29. The power calculation circuit 29 now calculates ten to the power $z_f$, namely, a result v of the power calculation to deliver a power signal CF representative of the result v to the second field of the fifth register 27, where the power signal CF is substituted for the previously stored mantissa signal CC. The fifth register 27 supplies the characteristic signal CB and the power signal CF to a display circuit 32 described later as a decimal point signal CG and a floating point signal CH, respectively, which in combination serves as a result signal representative of the exponential function $a^x$. The display circuit 32 may be any other utilization device.

It may be mentioned here that ten to the power z, namely, a total result of power calculation $10^z$, gives the exponential function $a^x$ and that ten to the power $z_i$ represents that place in the result v at which the decimal point, if any, should be placed. The calculator is therefore simplified by calculation of the result v rather than the total result. It may also be mentioned that the result v is equal to or greater than unity and is smaller than ten and gives the desired value of the exponential function $a^x$ when multiplied by $10^{z_i}$. Thus, the result v is the coefficient of the normalized $10^z$.

Figure 2:
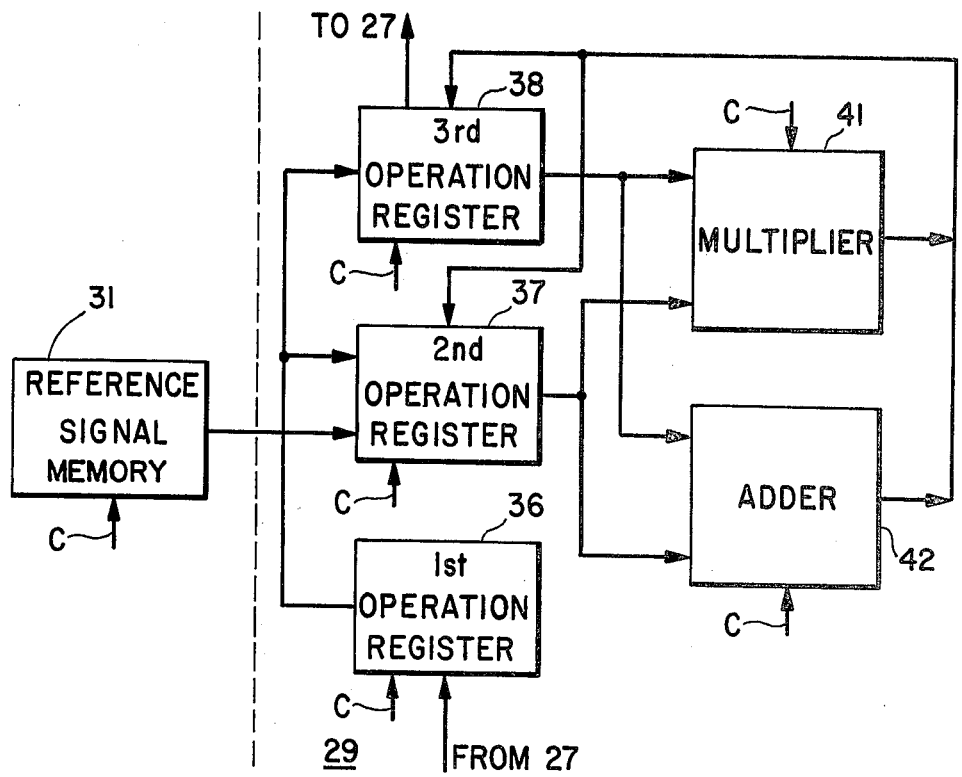
FIG. 2 is a block diagram of a power calculation circuit and a reference signal memory for use in the calculator shown in FIG. 1.

Referring to FIG. 2, a power calculation circuit 29 for use in a calculator according to a more preferred embodiment of this invention is for calculating an approximate value of ten to the power $z_f$ by the use of an equation described by Cecil Hastings, Jr. in "Approximation for Digital Computers," Princeton University Press, Princeton, N.J., 1955, page 141:

$$10^{z_f} \approx [1 + z_f(a_1 + z_f(a_2 + z_f(a_3 + a_4 z_f)))]^2,$$

where $a_1 = 1.1499196$, $a_2 = 0.6774323$, $a_3 = 0.2080030$, and $a_4 = 0.1268089$. The calculation circuit 29 is accompanied by a reference signal memory 31 memorizing the constants 1 and $a_1$ through $a_4$ as a reference value to successively produce, as a reference signal CE, signals representative of fourth through zeroth constants $a_4$, $a_3$, $a_2$, $a_1$, and unity. The calculation circuit 29 comprises a first operation register 36 supplied with the above-mentioned mantissa signal CD representative of the mantissa $z_f$, a second operation register 37, a third operation register 38 for producing the power signal CF, and a multiplier 41 and an adder 42, both connected to the second and the third operation registers 37 and 38. The control circuit 12 (FIG. 1) produces various control signals C to put the illustrated calculation circuit 29 into operation as follows:

At first, the first operation register 36 is loaded with the mantissa $z_f$. In the meantime, the second operation register 37 is loaded with the fourth constant $a_4$. The mantissa $z_f$ is moved to the third operation register 38. The multiplier 41 now calculates $a_4 z_f$. The third operation register 38 is loaded with the product $a_4 z_f$. Simultaneously, the second operation register 37 is loaded with the third constant $a_3$. The adder 42 calculates $a_3 + a_4 z_f$, with which the third operation register 38 is now loaded. The mantissa $z_f$ is moved to the second operation register 37. The multiplier 41 calculates $z_f(a_3 + a_4 z_f)$, with which the third operation register 38 is loaded. Through repetition of similar operation, the third operation register 38 is loaded from the ladder 42 with the sum enclosed with the most outside brackets. At the same time, the second operation register 37 is also loaded with the last-mentioned sum. The multiplier 41 now calculates the square of the last-mentioned sum. The third operation register 38 is loaded with the square and is ready for producing the power signal CF.

Figure 3:
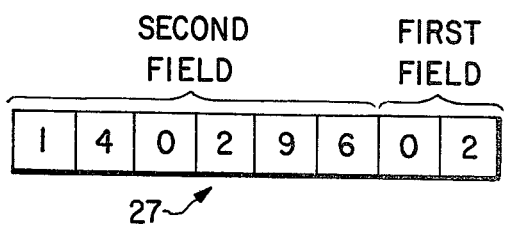
FIG. 3 shows a content of a register used in the calculator illustrated in FIG. 1.

Referring to FIG. 3, an example of the fifth register 27 is for eight digits. The first field mentioned above is provided by two digits depicted on the righthand side while the second field, by the remaining six digits. The numerals exemplified in the first and the second fields represent in combination a result of calculation of the exponential function with the base 3 and the exponent 4.5, namely $3^{4.5}$. As will readily be understood, the characteristic and the mantissa signals CB and CC produced for the result of calculation represent 2 and 0.147046. The characteristic signal CB is retained in the first field as "02." The power signal CF represents 1.40296 because $10^{0.147046}$ = 1.40296. The power signal CF is stored in the second field as "140296" without the decimal point. In combination, the result of calculation is 140.296. The fifth register 27 may produce the decimal point and the floating point signals CH and CG in whichever of bit series and bit parallel. The display circuit 32 may display the result of calculation either serially in the order of, for example, 1, 4, 0, 2, 9, 6, 0, and 2, or simultaneously as 14029602. For this purpose, the display circuit 32 may comprise either a series-to-parallel or a parallel-to-series converter (not shown). Alternatively, the display circuit 32 may comprise a circuit (not shown) for displaying a decimal point in response to the decimal point signal CG to display the result of calculation as 140.296 either serially or simultaneously.

Use may be made as the separation circuit 25 of a circuit which comprises two registers one of which stores a whole digit of the characteristics and the mantissa parts to shift them digit by digit and the other of which stores the characteristic part shifted from the former register with the mantissa part left therein.

While one preferred embodiment of this invention has so far been described, it is now readily possible for those skilled in the art to modify the illustrated embodiment in various manners. For example, use is possible of an additional register for storing a positive or a negative sign of the result stored in the register 27. The mantissa and the power signals CC and DV may be stored in different registers. The utilization device CF the display circuit 32 may be a memory in the calculator. The keyboard section 11 may have a register key for e to facilitate calculation of $e^x$. The exponent x may be theoretically an irrational number.

What is claimed is:

1. A calculator for calculating an exponential function $a^x$ with the base a in response to a base signal representative of said base and an exponent signal representative of the exponent to produce a result signal representative of said exponential function, where a and x represent a positive and a real number of decimal notation, respectively, said calculator comprising:

first calculation means responsive to said base signal for calculating a common logarithm of said base a to produce a common logarithm signal representative of said common logarithm;

second calculation means responsive to said common logarithm and said exponent signals for multiplying said common logarithm by said exponent to produce a product signal representative of that product of said common logarithm and said exponent which has a characteristic and a mantissa part;

separation means responsive to said product signal for separating said characteristic and said mantissa parts to individually produce a characteristic and a mantissa signal representative of said characteristic and said mantissa parts, respectively;

memory means for memorizing a reference signal representative of a reference value for a calculation of ten to the power of said mantissa part;

third calculation means responsive to said reference and said mantissa signals for calculating ten to the power of said mantissa part to produce a power signal representative of ten to the power of said mantissa part; and output means for producing said characteristic signal and said power signal in combination as said result signal.

2. The calculator as claimed in claim 1, wherein said third calculation means comprises power calculation means responsive to said reference and said mantissa signals for producing as said power signal a floating-point signal representative, without a decimal point, of said ten to the power said mantissa part as a sequence of numerals of which the most significant digit is not smaller than unity and is smaller than ten.

3. The calculator as claimed in claim 2, wherein said output means comprises:

a register having a first and a second field for storing said characteristic and said floating-point signals, respectively; and means for producing said characteristic and said floating-point signals as a first and a second part of said result signal.

4. The calculator as claimed in claim 3, further comprising a display circuit responsive to said first and said second result signal parts for displaying said exponential function by said sequence of numerals with a decimal point placed between an i-th and a j-th numeral as counted from said most significant digit to the least significant digit of said numeral sequence, i being representative of said characteristic part one.

5. The calculator as claimed in claim 1, further comprising programmable means responsive to a predetermined one of said base and said exponent signals for producing a sequence of successive control signals, equal in number to four times a predetermined integer, according to a prescribed program, wherein:

said memory means comprises means for producing as said reference signal a plurality of partial reference signals representative of predetermined constants, respectively, said partial reference signals being successively numbered from one to said predetermined integer;

said power calculation means comprising:

register means for storing said mantissa signal to produce a stored mantissa signal representative of said mantissa part;

a first operation register for first successive variable signals, each representing a first content;

a second operation register for second successive variable signals, each representing a second content;

a multiplier responsive to a first pair of the first and the second variable signals simultaneously present in said first and said second operation registers for calculating a product of the first and the second contents represented by said first pair to produce a product signal representative of said product;

an adder responsive to a second pair of the first and the second variable signals simultaneously present in said first and said second operation registers for calculating a sum of the first and the second contents represented by said second pair to produce a sum signal representative of said sum;

means responsive to a first control signal in said sequence for storing said stored mantissa signal and a first of said partial reference signals in one and the other of said first and said second operation registers as pertinent ones of said first and said second variable signals;

means responsive to a third control signal in said sequence and to control signals numbered four times first integers plus three in said sequence for storing a second through a last of said partial reference signals, respectively, in said first operation register as pertinent ones of said first variable signals, said first integers starting at one and ending at said predetermined integer less two;

means responsive to each of the control signals numbered four times said first integers plus one in said sequence for storing said stored mantissa signal in said first operation register as a pertinent one of said first variable signals;

means responsive to said third control signal and the control signals numbered four times second integers plus three in said sequence for storing the respective product signals in said second operation register as pertinent ones of said second variable signals, said second integers starting at one and ending at said predetermined integer less one;

means responsive to control signals numbered four times said second integers plus one in said sequence for storing the respective sum signals in said second operation register as other pertinent ones of said second variable signals;

means responsive to a second control signal in said sequence and to control signals numbered four times said second integers plus two in said sequence for supplying relevant pairs, respectively, of said first and said second variable signals from said first and said second operation registers to said multiplier;

means responsive to the last control signal but one in said sequence for loading said first operation register as another pertinent one of said first variable signal the product signal produced in response to that first pair of the first and the second variable signals which is supplied to said multiplier in response to the last control signal but two in said sequence;

means responsive to control signals numbered four times said second integers in said sequence for supplying other relevant pairs, respectively, of said first and said second variable signals from said first and said second operation registers to said adder; and means responsive to the last control signal in said sequence for making said second operation register produce a relevant one of said second variable signals as said power signal.

6. The calculator as claimed in claim 5, wherein said predetermined integer is equal to five, the predetermined constants represented by said first through said last on said partial reference signals being equal to 0.1268089, 0.2080030, 0.6774323, 1.1499196, and 1, respectively.

* * * * *